United States Patent
Boneberg et al.

(10) Patent No.: US 7,135,244 B2
(45) Date of Patent: Nov. 14, 2006

(54) SYSTEM TO SUPPLY AT LEAST TWO COMPONENTS OF A GAS GENERATION SYSTEM

(75) Inventors: Stefan Boneberg, Beuren (DE); Bruno Motzet, Weilheim/Teck (DE); Alois Tischler, Aidenbach (DE); Marc Weisser, Owen/Teck (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 380 days.

(21) Appl. No.: 10/182,282

(22) PCT Filed: Dec. 20, 2000

(86) PCT No.: PCT/EP00/12997

§ 371 (c)(1),
(2), (4) Date: Nov. 26, 2002

(87) PCT Pub. No.: WO01/56105

PCT Pub. Date: Aug. 2, 2001

(65) Prior Publication Data

US 2003/0138681 A1    Jul. 24, 2003

(30) Foreign Application Priority Data

Jan. 26, 2000  (DE) ................................ 100 03 274

(51) Int. Cl.
 H01M 8/06   (2006.01)
 B01J 8/04   (2006.01)
(52) U.S. Cl. .................. 429/20; 422/188; 422/198
(58) Field of Classification Search .............. 429/13, 429/17, 20, 26
See application file for complete search history.

(56) References Cited

U.S. PATENT DOCUMENTS 5,043,232 A * 8/1991 Landau et al. ................ 429/13

FOREIGN PATENT DOCUMENTS

| EP | 0 206 608 A2 | 12/1986 |
| EP | 0 831 055 A2 | 3/1998 |
| EP | 0 920 064 A1 | 6/1999 |
| EP | 0 921 584 A2 | 6/1999 |
| EP | 0 977 293 A2 | 2/2000 |
| WO | WO 99/65097 | 12/1999 |
| WO | WO 9965097 A1 * | 12/1999 |

* cited by examiner

Primary Examiner—Patrick Joseph Ryan
Assistant Examiner—Robert Hodge
(74) Attorney, Agent, or Firm—Crowell & Moring LLP

(57) ABSTRACT

A system for supplying an evaporated and/or superheated hydrocarbon or hydrocarbon/water mixture to at least two components of a gas generation system of a fuel cell system, in particular to at least two stages of a multi-stage reforming process. In one embodiment, the system contains at least two heat exchangers, each of which contains a media-side area and an area that serves to input thermal energy. Furthermore, each of the heat exchangers is connected to least one of the components of the gas generation system and the two heat exchangers are connected to each other. In an alternate embodiment, the system contains one heat exchanger, the media-side area of which is connected to a valve device, which distributes the evaporated and/or superheated mixture to at least two conduits, each of which leads to one of the two components of the gas generation system.

11 Claims, 4 Drawing Sheets

SYSTEM TO SUPPLY AT LEAST TWO COMPONENTS OF A GAS GENERATION SYSTEM

CROSS-REFERENCE TO RELATED APPLICATION

This application is a U.S. National Phase Application of International Application No. PCT/EP06/12997, filed Dec. 20, 2000, which claims priority to German Patent Application No. 100 03 274.5, filed Jan. 26, 2000, both of which are incorporated herein by reference in their entireties.

BACKGROUND OF THE INVENTION

1. Field of the Invention

The invention is generally directed to a system for supplying a superheated hydrocarbon or hydrocarbon/water mixture to at least two components of a gas generation system of a fuel cell system, in particular to at least two stages of a multi-stage reforming process.

2. Description of the Related Art

Generation systems for producing hydrogen-containing gases for use in fuel cell systems, in particular for use in mobile applications such as motor vehicles, comprise several components. In addition to the components that are usually connected in series, such as a reformer, a purification stage or similar elements, the operating state of the fuel cell system may make it necessary to supply an evaporated and/or superheated hydrocarbon or hydrocarbon/water mixture to at least two components of the gas generation system in parallel. For this purpose, two separate systems to evaporate or superheat the hydrocarbon or the hydrocarbon/water mixture are typically employed.

For example, DE 196 39 150 C2 describes a system that provides the thermal energy needed for the evaporation and/or superheating of the hydrocarbon or hydrocarbon/water mixture by means of a central heating device. A fuel and an oxygen-containing gas are catalytically oxidized in the central heating device and the thermal energy generated is then supplied to the individual system components of the gas generation system by means of a heat transfer medium. This distribution of thermal energy requires appropriate pipe elements, which connect the heat-transfer medium side of the central heating device with the individual system components. However, these transfer areas and pipe elements are subject to significant heat losses, which lower the overall efficiency of the system.

Another disadvantage of a system that uses a heat transfer medium to distribute generated thermal energy, is that is does not possess the dynamic response characteristics required for mobile applications, such as motor vehicles. A further disadvantage of such a system is that the heat transfer medium and the components that are to be supplied must be heated to an appropriate operating temperature by the central heating device before the entire system is able to provide gas generation operations proportionate with the load requirements put on a fuel cell of the fuel cell system.

Accordingly there remains a need for a system for supplying a superheated hydrocarbon or hydrocarbon/water mixture to components of a gas generation system that overcomes the disadvantages associated with a system that uses a heat transfer medium to distribute the generated thermal energy. The present invention fulfills one or more of these needs, and provides further related advantages.

BRIEF SUMMARY OF THE INVENTION

In brief, this invention is directed to a system for supplying a superheated hydrocarbon or hydrocarbon/water mixture to at least two components of a gas generation system of a fuel cell system, in particular to at least two stages of a multi-stage reforming process.

In one embodiment, a system supplies a hydrocarbon or hydrocarbon/water mixture to a first component and a second component in a gas generation system of a fuel cell system, wherein the hydrocarbon or hydrocarbon/water mixture is evaporated, superheated or evaporated and superheated. The system comprises a first heat exchanger connected to the first component, the first heat exchanger comprising a first media-side area and a first area for the input of thermal energy; and a second heat exchanger connected to the second component, the second heat exchanger comprising a second media-side area and a second area for the input of thermal energy, wherein the first and second areas for the input of thermal energy are connected in series.

In an alternate embodiment, the system comprises a heat exchanger, the heat exchanger comprising a media-side area and an area for the input of thermal energy; and a valve device, the valve device connected to the media-side area of the heat exchanger, a first conduit and a second conduit, wherein the first conduit is connected to the first component and the second conduit is connected to the second component.

These and other aspects of this invention will be apparent upon reference to the attached figures and following detailed description.

BRIEF DESCRIPTION OF THE SEVERAL VIEWS OF THE DRAWING(S)

DETAILED DESCRIPTION OF THE INVENTION

As noted above, this invention is directed to a system for supplying a superheated hydrocarbon or hydrocarbon/water mixture to at least two components of a gas generation system of a fuel cell system, in particular to the stages of a multi-stage reforming process.

Figure 1:
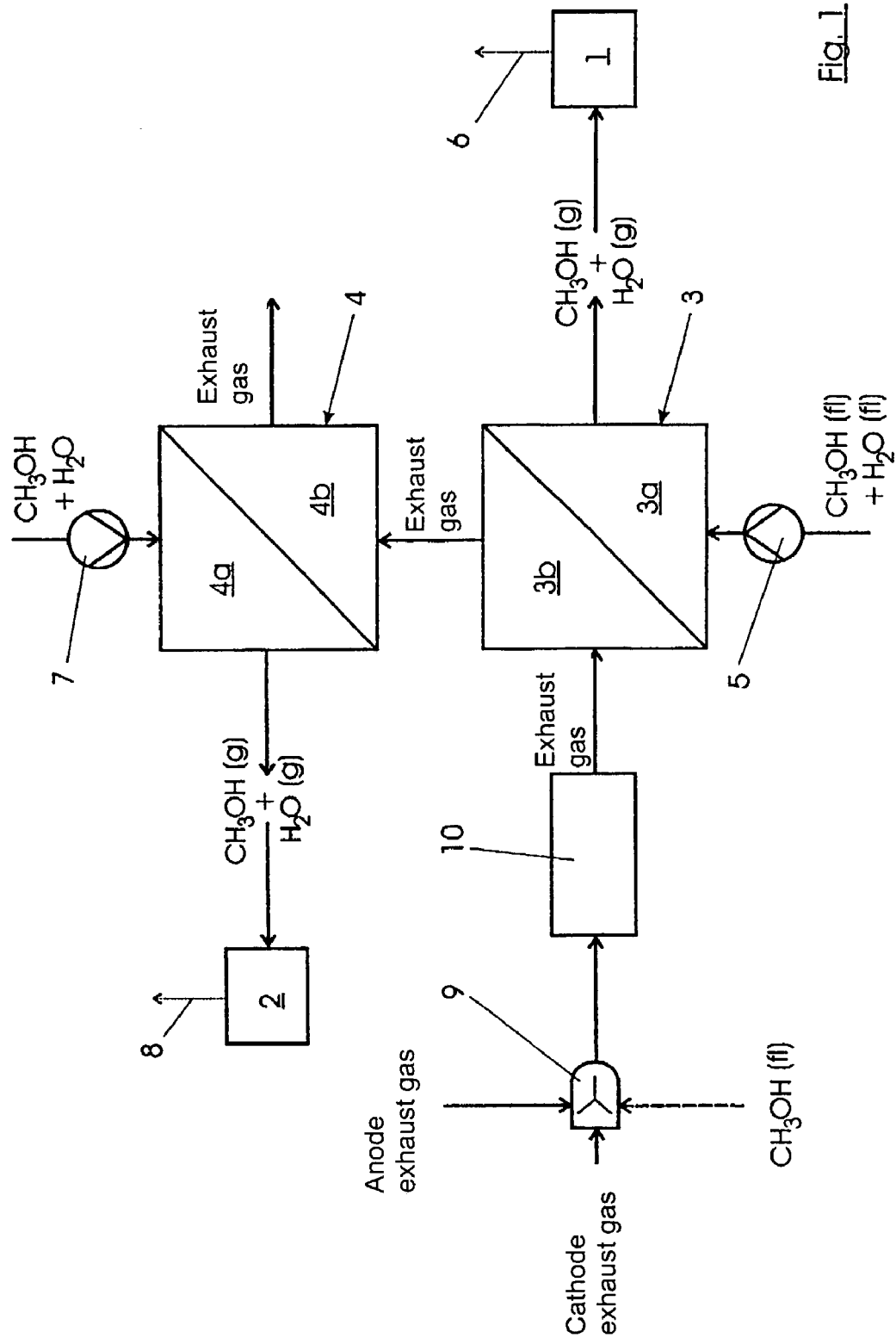
FIG. 1 shows a representative system for supplying at least two components of a gas generation system with a superheated hydrocarbon or hydrocarbon/water mixture, comprising one burner and two heat exchangers.

FIG. 1 shows a representative system for supplying an evaporated and/or superheated hydrocarbon or hydrocarbon/water mixture to two components 1 and 2 of a gas generation system of a fuel cell system. In particular, these two components 1 and 2 are two stages of a multi-stage reforming process, for example a component 1 for partial oxidation and a component 2 for catalytic reforming. Furthermore, as illustrated in FIG. 1, the hydrocarbon/water mixture employed is a mixture of methanol ($CH_3OH$) and water ($H_2O$).

As shown in FIG. 1, the system comprises two heat exchangers 3 and 4, each of which contains one media-side area 3a and 4a, respectively, and one area for the input of thermal energy (a heat input area) 3b and 4b, respectively. Component 1 is supplied with the methanol and water mixture through heat exchanger 3 and a metering device 5. After the methanol and water mixture has been reformed or partially reformed in component 1, the product can then be used in a conventional manner in downstream gas purification and fuel cell systems, such use being indicated by dotted arrow 6. The equivalent is true for component 2, which is supplied with the methanol and water mixture through heat exchanger 4 and a metering device 7. As with component 1, dotted arrow 8 indicates a conventional further path and use of the products. Metering devices 5 and 7 may be configured to adjust the supply of the methanol and water mixture to heat exchangers 3 and 4, for example, depending on the temperature of components 1 and 2.

As illustrated, in mixing device 9, the anode exhaust gas and the cathode exhaust gas of a fuel cell (not shown) of a fuel cell system (not shown in its entirety) are mixed. The cathode exhaust gas of the fuel cell contains a comparatively high content of residual oxygen and this residual oxygen is burned in a pre-heating burner 10 together with the residual amounts of hydrogen, methanol, and possibly carbon monoxide, contained in the anode exhaust gas.

No feed equipment is necessary to supply the above-mentioned gases to pre-heating burner 10, since the gases originating from the anode and cathode of the fuel cell already possess a specific system-dependent pressure. During the start-up phase of the fuel cell system, the fuel cell may not able to provide a sufficient quantity of anode exhaust gas to the pre-heating burner, however air is still present at the cathode of the fuel cell and this air will reach mixing device 9 as "cathode exhaust gas". During these operating states, mixing device 9 may optionally be supplied with an additional fuel, such as the hydrocarbon already present in the fuel cell system (e.g., methanol). This optional supply of methanol into mixing device 9 is desired if, due to certain load conditions in the fuel cell system (e.g., at the start of a sudden load increase), the combustible residual substances present in the anode exhaust gas are temporarily not sufficient to generate the required thermal energy in pre-heating burner 10.

Pre-heating burner 10 may be a thermal burner, which completely burns the introduced gases and any introduced methanol. By designing a burner nozzle and a combustion chamber appropriate for the respective fuel, a thermal burner achieves a very high system efficiency. Consequently, the predominant portion of the thermal energy generated by the combustion in pre-heating burner 10 is transferred to the burner exhaust gases. Furthermore, combustion in pre-heating burner 10 allows for a comparatively simple design of heat exchanger 3 since heat exchanger 3 is not required to, withstand particularly high pressures, as would be the case if combustion occurred directly in heat exchanger 3, as described in FIG. 3 below.

As shown in FIG. 1, the exhaust gases are directed to heat input area 3b of heat exchanger 3 and the heat input area 4b of heat exchanger 4. Heat exchanger 4 is operated in, countercurrent, which permits lowering of the temperature of the burner exhaust gas to a very low level when it exits heat exchanger 4, and consequently, utilizes almost all of the thermal energy in the burner exhaust gas. Depending on the particular system requirements, heat exchanger 3 may be operated in countercurrent flow, in concurrent flow (as shown in FIG. 1), or in a cross flow configuration. This results in a large number of options, which allow great flexibility in supplying the two components 1 and 2 with the appropriate quantity of methanol/steam mixture at an appropriate temperature level.

In one embodiment, heat exchanger 3 may be constructed in a very lightweight design. The resulting lower thermal capacity of heat exchanger 3 results in rapid dynamic response characteristics for heat exchanger 3, and in the event of a cold-start of the gas generation system and/or the fuel cell system, heat exchanger 3 can be heated to the required temperature very rapidly. This also makes it possible to implement a dynamic methanol/steam supply that could be different for components 1 and 2. For example, component 1 may be configured to achieve a very high reforming output, in particular during a cold-start of the system, and component 2 could be configured to process the main portion of methanol to be reformed after the desired final system temperature has been reached. In combination with the corresponding heat exchangers 3 and 4, the size and mass of which are matched to the specific conditions, the resulting system possesses good dynamic response characteristics in addition to excellent cold-starting properties.

Figure 2:
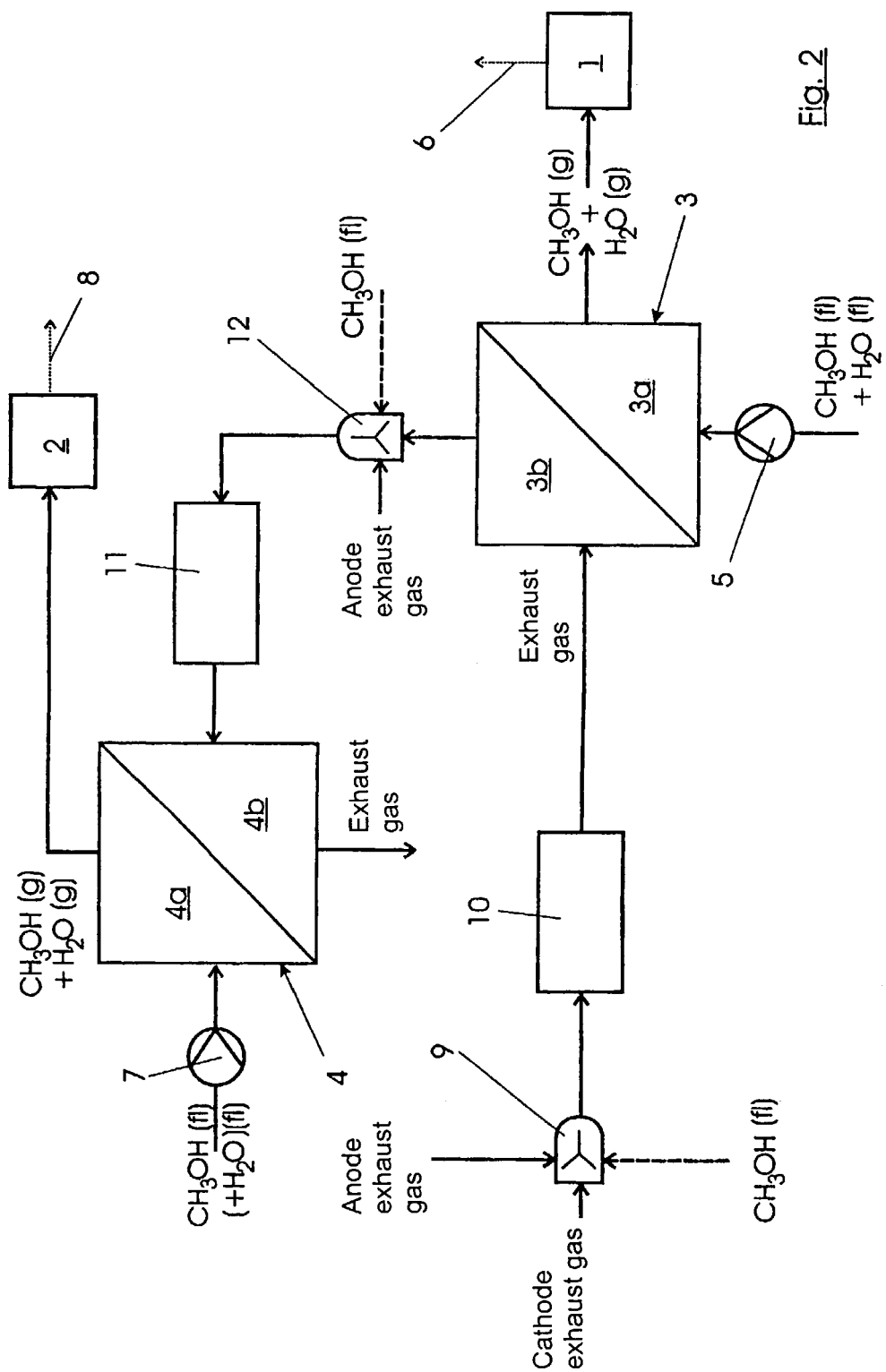
FIG. 2 shows an additional representative system for supplying at least two components of a gas generation system with a superheated hydrocarbon or hydrocarbon/water mixture, comprising two burners and two heat exchangers.

FIG. 2 shows an additional representative system for supplying an evaporated and/or superheated hydrocarbon or hydrocarbon/water mixture to two components 1 and 2 of a gas generation system of a fuel cell system, which, in addition to a pre-heating burner 10, contains an afterburner 11. Afterburner 11 is supplied with the exhaust gas of the pre-heating burner 10 which has passed through heat exchanger 3, additional anode exhaust gas, and possibly with additional fuel (e.g., methanol), through a mixing device 12.

The mode of operation of the system of FIG. 2 is similar to the mode of operation of the system according to FIG. 1. However, with the addition of afterburner 11, which is arranged in the burner exhaust gas flow between heat exchanger 3 and heat exchanger 4, the exhaust gas from pre-heating burner 10 and heat exchanger 3 may be heated to a higher temperature level before being directed to heat exchanger 4. This improves the flexibility of the system as well as the dynamic response characteristics of heat exchanger 4.

The two burners 10 and 11 may both be thermal burners, or a catalytic pre-heating burner and a purely thermal afterburner, or a comparable combination may be used. By using pre-heating burner 10 and afterburner 11, it is possible to use virtually all of the residual combustible substances in the exhaust gases to generate the required thermal energy. In particular, in combination with a heat exchanger operating in counterflow, as is the case with heat exchanger 4, it is possible to utilize practically all of the chemical and thermal energy contained in the fuel cell exhaust gas, which increases the efficiency of the entire system.

The discussions above with respect to FIG. 1 regarding the control and ratio of masses or thermal capacities of the respective heat exchangers 3 and 4 apply to the system of FIG. 2 as well.

Figure 3:
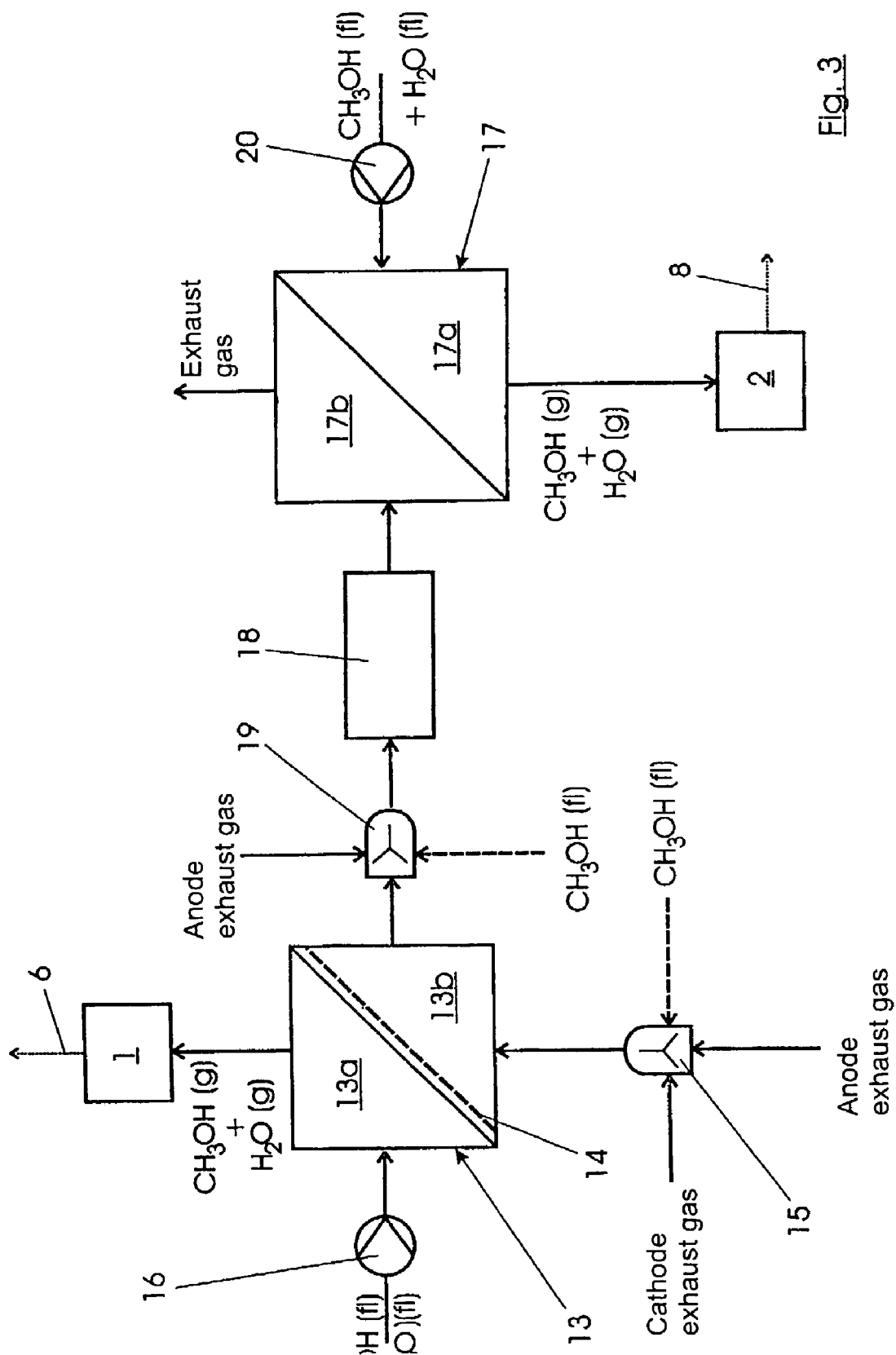
FIG. 3 shows a further representative system for supplying at least two components of a gas generation system with a superheated hydrocarbon or hydrocarbon/water mixture, comprising one burner and two heat exchangers, with one heat exchanger heated directly by catalytic combustion.

FIG. 3 shows an additional representative system for supplying an evaporated and/or superheated hydrocarbon or hydrocarbon/water mixture to two components 1 and 2 of a gas generation system of a fuel cell system, which employs one heat exchanger 13 that is directly heated catalytically, and which contains a catalytic material 14 in its heat input area 13b. Catalytic material 14 may be in the form of a coating inside heat exchanger 13 or an additional component coated with catalytic material. Through a mixing device 15, a mixture of fuel cell anode exhaust gas and cathode exhaust gas, to which fuel (e.g., methanol) may be added, is supplied to heat input area 13b of heat exchanger 13. Catalytic combustion takes place in heat input area 13b and part of the generated heat is transferred directly to the media-side area 13a of heat exchanger 13, transferring the thermal energy to the methanol and water mixture circulating in the media-side area 13a. As in FIG. 1, the methanol and water mixture is introduced into the media-side area 13a through a metering device 16.

The resulting methanol/steam mixture from the media-side area 13a of heat exchanger 13 is supplied to component 1 of the gas generation system, where it is completely or partially reformed. The product can then be used in a conventional manner in downstream gas purification and fuel cell systems, such use being indicated by dotted arrow 6.

The heated exhaust gases from the catalytic combustion in the heat input area 13b of heat exchanger 13 then pass to the additional heat exchanger 17, which is operated in counter-current and is similar in its basic mode of operation to the heat exchanger 4 of the system of FIG. 1. As described previously, the countercurrent operation of heat exchanger 17 permits lowering of the temperature of the final exhaust gas to a very low level.

Connected between heat exchanger 13 and heat exchanger 17 is an afterburner 18. Afterburner 18 is either a catalytic burner or a thermal burner, and may be supplied with anode exhaust gas of the fuel cell and optionally additional fuel (e.g. methanol) through a mixing device 19. Afterburner 18 makes it possible to re-heat the comparatively cold exhaust gases of the catalytic combustion exiting heat exchanger 13, and to burn essentially all remaining residual substances in the exhaust gas. In combination with the countercurrent operation of heat exchanger 17, this further increases the overall efficiency of the system, and reduces the pollutant emissions in the exhaust gas, since the comparatively high temperature that can be reached in afterburner 18 oxidizes nearly all of the residual combustible substances in the exhaust gas.

In heat exchanger 17, the methanol and water mixture introduced through a metering device 20, is evaporated and is transferred to component 2 of the gas generation system, where it is where it is completely or partially reformed. The product can then be used in a conventional manner in downstream gas purification and fuel cell systems, which use is indicated by dotted arrow 8.

Figure 4:
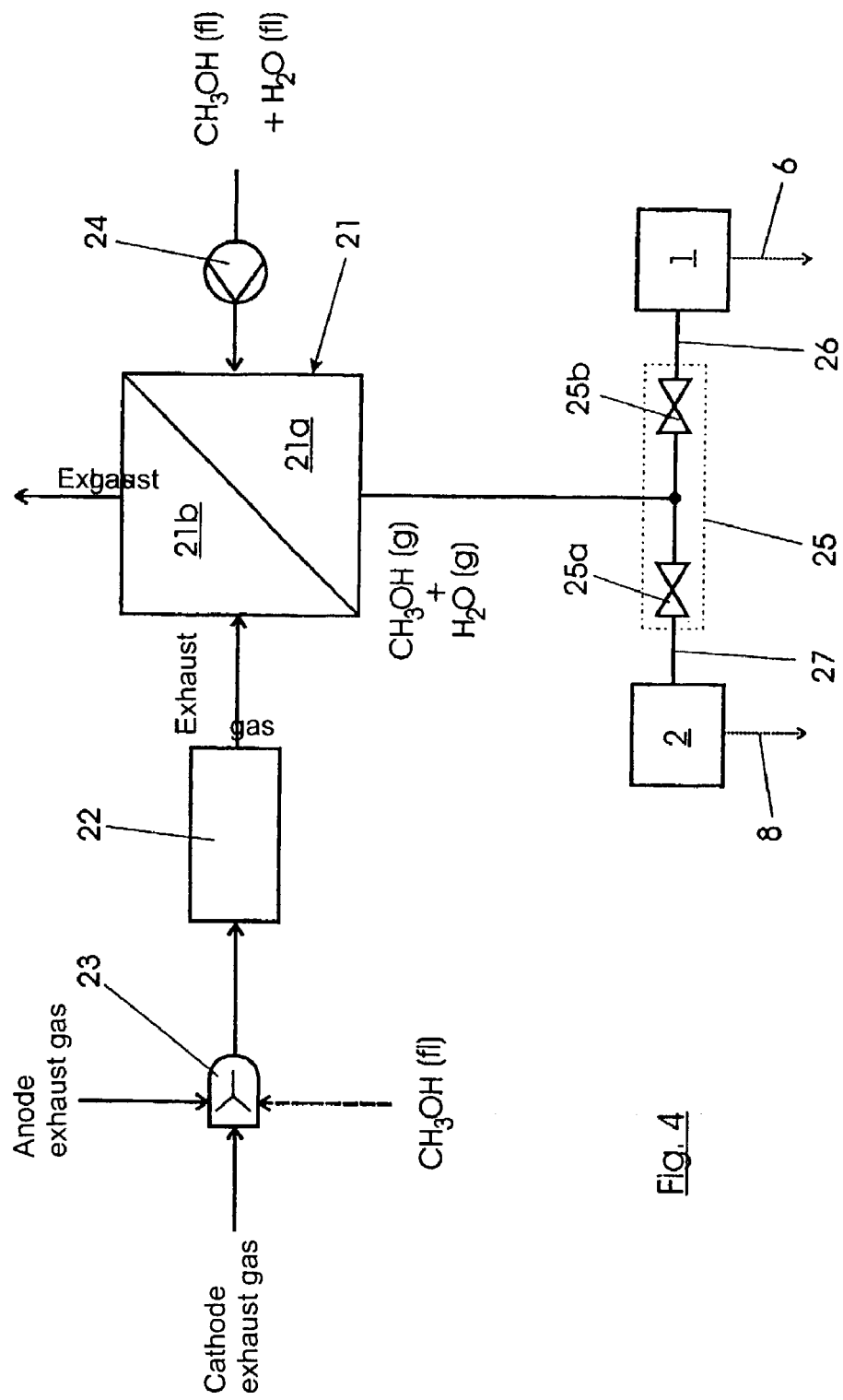
FIG. 4 shows yet a further representative system for supplying at least two components of a gas generation system with a superheated hydrocarbon or hydrocarbon/water mixture, comprising one heat exchanger and one valve device.

FIG. 4 shows an additional representative system for supplying an evaporated and/or superheated hydrocarbon or hydrocarbon/water mixture to two components 1 and 2 of a gas generation system of a fuel cell system. The system contains only one heat exchanger 21, which may be operated in counterflow, and contains a media-side area 21a and a heat input area 21b. In a similar manner to the system of FIG. 1, the heated exhaust gas from combustion occurring a pre-heating burner 22 is fed to heat input area 21b. As described previously, the stream used for combustion occurring in pre-heating burner 22, comprises anode and cathode exhaust gases of the fuel cell, and possibly some added methanol, which have been combined in a mixing device 23.

The heated exhaust gases flowing through the heat input area 21b of heat exchanger 21 serve to evaporate a methanol and water mixture, which is supplied to the media-side area 21a of heat exchanger 21 through a metering device 24. From the media-side area 21a, the methanol/steam mixture is directed to a valve device 25, which is indicated in FIG. 4 by two single control valves 25a and 25b. Valve device 25, which can act as a controllable proportional valve, distributes the methanol/steam mixture, according to the system requirements (e.g., as a function of the current system temperature, such as the temperature of components 1 and 2), through two pipe systems 26 and 27 to components 1 and 2, respectively, of the gas generation system. Valve device 25 may include a three-way tap or two two-way valves.

As in the preceding Figures, the methanol/steam mixture is completely or partially reformed in components 1 and 2 and the product can then be used in a conventional manner in downstream gas purification and fuel cell systems, which use is indicated by dotted arrows 6 and 8.

The system illustrated in FIG. 4 does not require a second metering device and only needs one pre-heating burner 22 and one heat exchanger 21. Accordingly, the system illustrated in FIG. 4 is a practical and compact embodiment of a system for supplying a superheated hydrocarbon or hydrocarbon/water mixture to at least two components of a gas generation system of a fuel cell system. Furthermore, the comparatively simple and light-weight design, makes it possible, due to the low heat capacity and a comparatively low weight, to rapidly heat the system to the desired operating temperatures. This facilitates improved cold-start behavior.

The invention claimed is:

1. A system to supply a hydrocarbon or hydrocarbon/water mixture to a first component and a second component of a gas generation system of a fuel cell system, wherein the hydrocarbon or hydrocarbon/water mixture is evaporated, superheated or evaporated and superheated, the system comprising:
   a first heat exchanger connected to supply a first heated flow of said hydrocarbon or hydrocarbon/water mixture to the first component of the gas generation system, the first heat exchanger comprising a first media-side area and a first area for the input of thermal energy; and
   a second heat exchanger connected to supply a second heated flow of said hydrocarbon or hydrocarbon/water mixture to the second component of the gas generation system, the second heat exchanger comprising a second media-side area and a second area for the input of thermal energy,
   wherein the first and second areas for the input of thermal energy are connected in series.

2. The system of claim 1, further comprising a catalytic material, wherein the catalytic material is contained within the first area for the input of thermal energy.

3. The system of claim 1, further comprising a pre-heating burner connected to the first area for the input of thermal energy.

4. The system of claim 3 wherein:
   the preheating burner is located upstream of the first heat exchanger;
   exhaust gas from a fuel cell of the fuel cell system, an additional fuel or both undergo a chemical reaction in the pre-heating burner; and
   said chemical reaction is one of oxidation and catalytic combustion.

5. The system of claim 1, further comprising an afterburner, wherein the afterburner is connected to, and located between, the first and second areas for the input of thermal energy.

6. The system of claim 1 wherein one of the first and second heat exchangers has a smaller mass than the other.

7. The system of claim 1, further comprising a first metering device connected to the first media-side area and a second metering device connected to the second media-side area, wherein the first and second metering devices are located upstream of the first and second media-side areas, respectively.

8. The system of claim 7 wherein the first and second metering devices are configured to adjustably supply the hydrocarbon or the hydrocarbon/water mixture to the first and second media-side areas depending on the temperatures of the first and second components.

9. The system of claim 1 wherein the second heat exchanger is operated in a countercurrent configuration.

10. The system of claim 1 wherein the hydrocarbon comprises methanol.

11. The system of claim 1 wherein gas generation system comprises means for generating hydrogen from methanol fuel.

* * * * *